United States Patent
Van Cayzeele

(10) Patent No.: US 7,552,928 B2
(45) Date of Patent: Jun. 30, 2009

(54) METHOD FOR OPERATING ACTIVE STABILIZERS IN MOTOR VEHICLES AND MOTOR VEHICLE HAVING ACTIVE STABILIZERS

(75) Inventor: Patricio Van Cayzeele, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 341 days.

(21) Appl. No.: 11/322,432

(22) Filed: Dec. 30, 2005

(65) Prior Publication Data
US 2006/0192354 A1   Aug. 31, 2006

(30) Foreign Application Priority Data
Feb. 28, 2005   (DE) .................. 10 2005 009 002

(51) Int. Cl.
*B60G 21/055* (2006.01)
(52) U.S. Cl. .................................. 280/5.506
(58) Field of Classification Search ........... 280/5.52, 280/5.502, 5.506, 5.507, 5.508, 5.513, 5.515, 280/5.519, 755, 757, 5.5
See application file for complete search history.

(56) References Cited

U.S. PATENT DOCUMENTS

| | | | |
|---|---|---|---|
| 4,648,620 A * | 3/1987 | Nuss ................... | 280/5.511 |
| 6,039,326 A | 3/2000 | Agner | |
| 6,053,509 A * | 4/2000 | Izawa et al. ............ | 280/5.504 |
| 6,088,637 A | 7/2000 | Acker et al. | |
| 6,149,166 A * | 11/2000 | Struss et al. ........... | 280/5.511 |
| 6,425,585 B1 | 7/2002 | Schuelke et al. | |
| 6,550,788 B2 * | 4/2003 | Schmidt et al. ......... | 280/5.511 |
| 6,663,113 B2 | 12/2003 | Schülke et al. | |
| 6,805,361 B2 | 10/2004 | Germano et al. | |
| 7,354,048 B2 * | 4/2008 | Suzuki et al. ........... | 280/5.502 |
| 2004/0176890 A1 | 9/2004 | Acker et al. | |
| 2006/0038370 A1 | 2/2006 | Doerr et al. | |

FOREIGN PATENT DOCUMENTS

| | | |
|---|---|---|
| DE | 196 29 582 A1 | 1/1998 |
| DE | 198 46 275 A1 | 12/1999 |
| DE | 198 46 500 A1 | 4/2000 |
| DE | 198 36 674 C1 | 5/2000 |
| DE | 101 40 604 C1 | 4/2003 |
| DE | 101 57 085 A1 | 5/2003 |
| DE | 102 10 306 A1 | 9/2003 |
| DE | 102 33 499 A1 | 1/2004 |
| DE | 103 14 251 A1 | 10/2004 |
| EP | 1 403 104 A2 | 3/2004 |

* cited by examiner

*Primary Examiner*—Paul N. Dickson
*Assistant Examiner*—Robert A. Coker
(74) *Attorney, Agent, or Firm*—Manfred Beck, P.A.

(57) ABSTRACT

A method for operating active stabilizers in a motor vehicle includes an on-road mode and an off-road mode. In the on-road mode a stabilizer is activated and deactivated in dependence on operating parameters of the motor vehicle, in particular the travel speed and/or the lateral acceleration and/or a level sensor system, wherein in the activated state rolling motions of the vehicle are reduced by introducing torque into the stabilizer or stabilizers that counteracts the rolling motion. In the off-road mode, the stabilizer is deactivated up to a given travel speed or, in case of an alternate jouncing of the wheels, a control of the stabilizer is performed such that a downward force of the rebounding wheel is increased. Wheel slip may be used as a parameter when controlling the stabilizers. A motor vehicle having active stabilizers is also provided.

12 Claims, 3 Drawing Sheets

METHOD FOR OPERATING ACTIVE STABILIZERS IN MOTOR VEHICLES AND MOTOR VEHICLE HAVING ACTIVE STABILIZERS

BACKGROUND OF THE INVENTION

1. Field of the Invention

The invention relates to a method for operating active stabilizers in a motor vehicle and to a motor vehicle having active stabilizers.

Roll behavior of motor vehicles can be influenced by using active stabilizers. When there is an increased tendency of the vehicle body to roll, stabilizers can be used for coupling in a torque which acts counter to the roll tendency. For that purpose, the stabilizers on the axles are respectively separated in two parts and are connected to one another at their separated ends via an actuator.

When driving through a turn, the tilting or rolling motion of the vehicle body can be reduced by activating the stabilizers, i.e. by introducing a torsional moment between the separated ends. However, when driving straight ahead, the stabilizer is deactivated. Conventional stabilizer concepts however also provide for an effective connection between the separated ends via the actuators even in this situation. However in this case no additional torque is introduced.

The torque can be introduced both, with an electric actuator and with a hydraulic actuator. Examples for the introduction of torque are found in Published, Non-Prosecuted German Patent Application Nos. DE 196 29 582 A1, DE 198 36 674 A1, DE 102 10 306 A1, and DE 102 33 499 A1. This concept is also used in street vehicles for roll stabilization with the goal of avoiding an extreme articulation of the wheels of an axle. The main focus of the control is the leveling of the vehicle body and influencing the tendency of the vehicle to oversteer and understeer by alternately changing the rate of rolling at the vehicle axes in dependence of vehicle operation parameters such as the lateral acceleration.

European Patent Application No. EP 1 403 104 A2 and Published, Non-Prosecuted German Patent Application No. DE 101 57 085 A1 further disclose connecting the ends of a separated torsion bar stabilizer by a clutch, such that it is possible to switch back and forth between a coupled position and an uncoupled position. In the coupled position there is however no additional torque introduced into the mechanical system. In the uncoupled position the stabilizer is disabled. This concept is especially suited for off-road use, where allowing an increased articulation is desired. In this case this is achieved by uncoupling the stabilizer.

If a motor vehicle is to be tuned for on-road use as well as for off-road use, there is a target conflict with respect to the stabilization.

SUMMARY OF THE INVENTION

It is accordingly an object of the invention to provide a method for operating an active stabilizer in a motor vehicle which overcomes the above-mentioned disadvantages of the heretofore-known methods of this general type and which increases the application possibilities of active stabilizers in vehicles suitable for off-road use.

With the foregoing and other objects in view there is provided, in accordance with the invention, a method for operating an active stabilizer, which includes the steps of:

selectively operating a stabilizer of a motor vehicle in an on-road mode and an off-road mode;

performing the on-road mode by selectively activating and deactivating the stabilizer in dependence of operating parameters of the motor vehicle such that, in an activated state, a rolling motion of the motor vehicle is reduced by introducing a torque into the stabilizer counteracting the rolling motion; and performing the off-road mode by deactivating the stabilizer up to a given travel speed or by controlling the stabilizer such that, in case of an alternate jouncing of wheels, a downward force of a rebounding one of the wheels is increased.

In other words, according to the invention, there is provided, a method for operating active stabilizers in motor vehicles with an on-road mode in which a stabilizer is activated and deactivated in dependence on operating parameters of the motor vehicle, in particular the travel speed and/or the lateral acceleration and/or a level sensor system, wherein in the activated state rolling motions of the vehicle are reduced by introducing torque into the stabilizer or stabilizers that counteract the rolling motion, and with an off-road mode in which the stabilizer is deactivated up to a given travel speed or, in case of an alternate jouncing, a control of the stabilizer is performed such that a downward force of the rebounding wheel is increased.

This ensures a high ride comfort when driving on good roads without diminishing the off-road capabilities of the vehicle. The off-road mode improves the articulation at low travel speeds, because the rebounding wheel is not hindered in its rebounding. If applicable, the stabilizers can even be controlled such that the articulation is supported, in order to improve the downward force exerted by the rebounding wheel on the ground and thus to improve traction in off-road conditions.

According to a preferred embodiment of the invention, it is possible to manually switch between the off-road mode and the on-road mode. The driver can thus independently set the desired operating mode as the need arises. It is however also conceivable, by using a suitable assistance system, to distinguish between an on-road operation and an off-road operation by for example analyzing the vehicle lateral acceleration and/or the vehicle speed and/or a rebounding of the vehicle wheels.

An alternate jouncing and rebounding of the wheels of an axle can for example be detected by displacement sensors. In vehicles with an air suspension corresponding sensors are usually present as part of a level sensor system. However, in principle all systems from which the actual jouncing and rebounding of the vehicle wheels can be deducted qualify for this purpose.

According to a further advantageous embodiment of the invention, it may additionally be detected whether the vehicle drives with a tilt angle in the off-road mode, based on operating parameters of the vehicle for example from signals provided by displacements sensors of a level sensor system. If the vehicle drives with a tilt angle, then the stabilizer or stabilizers are controlled to bring the vehicle body into a horizontally leveled position, which improves the ride comfort. The control via the stabilizers can in this case be performed in fractions of a second. The control is thus considerably faster and more effective that a control via the air springs of a level control system whose level adjustment generally requires several seconds.

In order to further improve traction, the wheel slip of the wheels of an axle can be detected. If a deviation or difference of the slip values is ascertained, the stabilizer is controlled such that the downward force of the wheels, i.e. the downward force that the wheel exerts on the ground, is increased for the wheel that has the greater slip. If desired or necessary, this control of the stabilizer is performed by taking into account a limit value. When detecting a slipping wheel, it is in this manner possible to actively load this wheel or transfer the downward force exerted on the ground from the non-slipping wheel to the slipping wheel. This functionality can also be implemented in the on-road mode, for example in order to improve traction when driving off in a curve when there are low-friction conditions and unloaded wheels. In principle, it is possible to provide this functionality independently from an off-road mode. This applies also for the possibility of additionally carrying out a roll motion control in dependence of road friction conditions.

Finally, according to a further advantageous embodiment of the invention, a car jack mode can be realized by using the active stabilizers wherein the stabilizers are controlled in order to lift a vehicle wheel from a substantially level surface on which the vehicle stands. The car jack mode is preferably initiated via a manual switch.

Another mode of the method according to the invention includes controlling the stabilizer in the on-road mode in dependence of operating parameters, in particular a travel speed and/or lateral acceleration and/or a level sensor signal.

Yet another mode of the method according to the invention includes operating a further stabilizer of the motor vehicle selectively in the on-road mode and in the off-road mode.

A further mode of the method according to the invention includes manually switching between the on-road mode and the off-road mode.

Another mode of the method according to the invention includes detecting an alternate jouncing and rebounding of wheels (compressing and extending suspension springs) of an axle in the off-road mode by using displacement sensors.

Another mode of the method according to the invention includes detecting whether the motor vehicle drives with a tilt angle in the off-road mode based on operating parameters; and controlling the stabilizer such that a vehicle body is leveled if it is detected that the motor vehicle drives with a tilt angle.

Yet another mode of the method according to the invention includes detecting whether the motor vehicle drives with a tilt angle in the off-road mode based on signals ascertained by displacement sensors of a level sensor system.

Another mode of the method according to the invention includes determining a wheel slip of the wheels of an axle; and controlling the stabilizer or stabilizers such that a downward force exerted by a first one of the wheels of the axle is increased if wheel slip values of the wheels of the axle differ from one another and the first one of the wheels of the axle has a greater slip than a second one of the wheels of the axle.

A further mode of the method according to the invention includes providing a car jack mode by controlling stabilizers of the motor vehicle such that a wheel of the motor vehicle is lifted from a substantially level surface on which the motor vehicle stands.

Another mode of the method according to the invention includes performing a control of a rolling motion of the motor vehicle in dependence of road friction conditions.

With the objects of the invention in view there is also provided, a method for operating an active stabilizer including the steps of:

determining a wheel slip of wheels of an axle of a motor vehicle; and controlling an active stabilizer of the motor vehicle such that a downward force exerted by a first one of the wheels on a ground is increased if wheel slip values of the wheels of the axle differ from one another and the first one of the wheels of the axle has a greater slip than a second one of the wheels of the axle.

In other words, according to the invention, there is provided a method for operating active stabilizers in motor vehicles wherein the wheel slip of wheels of an axle is determined and, in case of a deviation of the slip values between one another, a control of the stabilizer is performed such that the downward force of the wheel having the greater slip is increased.

With the objects of the invention in view there is also provided, a motor vehicle configuration, including:

an axle having wheels;

an active stabilizer provided between the wheels of the axle;

the active stabilizer having two stabilizer sections separate from one another;

an actuator, the two stabilizer sections being connected to one another via the actuator and the actuator being configured to introduce a torque between the two stabilizer sections;

a control device operatively connected to the actuator for activating and deactivating the actuator, the control device having two operating modes implemented therein including an on-road mode and an off-road mode;

the control device, when operating in the on-road mode, selectively activating and deactivating the active stabilizer in dependence of motor vehicle operating parameters and the control device controlling the active stabilizer such that when the active stabilizer is in an activated state, the active stabilizer reduces a vehicle rolling motion by introducing a torque into the active stabilizer counteracting the vehicle rolling motion; and the control device, when operating in the off-road mode, deactivating the stabilizer up to a given travel speed or controlling the stabilizer such that, in case of an alternate jouncing of the wheels, a downward force of a rebounding one of the wheels is increased.

In other words, according to the invention, there is provided a motor vehicle including:

at least one active stabilizer provided between the wheels of an axle, which stabilizer has two separate sections connected via an actuator, wherein a torque can be introduced between the stabilizer sections via the actuator, and a control device for activating and deactivating the actuator or actuators, wherein two operating modes are implemented in the control device, namely:

an on-road mode in which a stabilizer is activated and deactivated in dependence on operating parameters of the motor vehicle, in particular the travel speed and/or the lateral acceleration and/or a level sensor system, wherein, in the activated state, a rolling motion of the vehicle is reduced by introducing torques into the stabilizer or stabilizers that counteract the rolling motion of the vehicle, and an off-road mode in which the stabilizer is deactivated up to a defined travel speed or, in case of an alternate jouncing, a control of the stabilizer is performed such that a downward force of the rebounding wheel is increased.

According to another feature of the invention, the control device, when operating in the on-road mode, controls the active stabilizer in dependence of at least one motor vehicle operating parameter, in particular a travel speed and/or a lateral acceleration and/or a level sensor signal.

With the objects of the invention in view there is also provided, a motor vehicle configuration, including:

an axle having wheels;

an active stabilizer provided between the wheels of the axle;

the active stabilizer having two stabilizer sections separate from one another;

an actuator, the two stabilizer sections being connected to one another via the actuator and the actuator being configured to introduce a torque between the two stabilizer sections;

a control device operatively connected to the actuator for activating and deactivating the actuator; and the control device ascertaining wheel slip values for the wheels and controlling the active stabilizer such that a downward force exerted by a first one of the wheels is increased if wheel slip values determined for the wheels differ from one another and if the first one of the wheels has a greater slip than a second one of the wheels.

In other words, according to the invention, there is provided a motor vehicle including:

at least one active stabilizer provided between the wheels of an axle, which stabilizer has two separate sections connected via an actuator, wherein a torque can be introduced between the stabilizer sections via the actuator, and a control device for activating and deactivating the actuator or actuators, wherein the control device is configured such that the wheel slip at the wheels of an axle is ascertained and, in case of a deviation or difference of the slip values between one another, a control of the stabilizer is performed in order to increase the downward force of the wheel having the greater slip.

Other features which are considered as characteristic for the invention are set forth in the appended claims.

Although the invention is illustrated and described herein as embodied in a method for operating active stabilizers in motor vehicles and a motor vehicle having active stabilizers, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
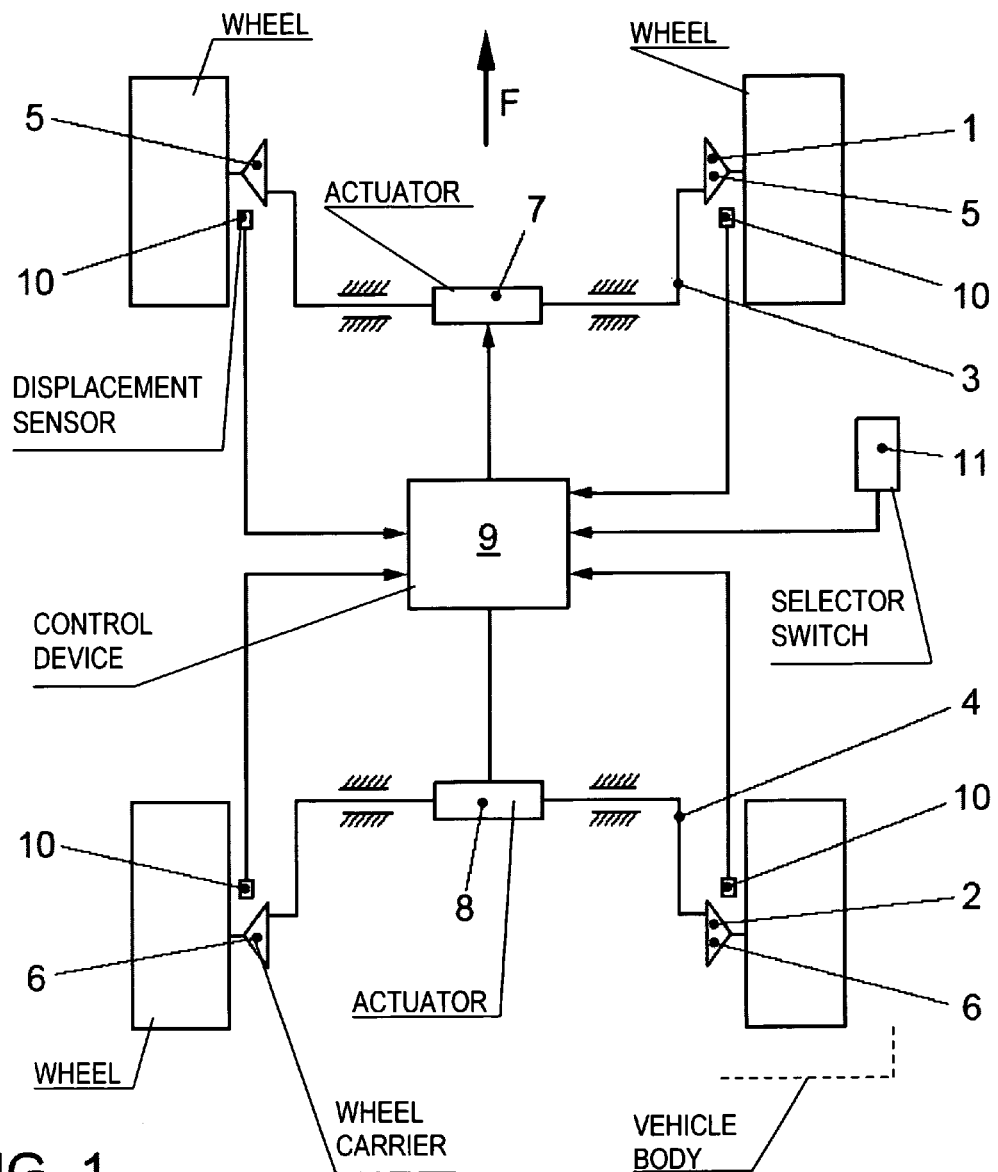
FIG. 1 is a schematic view of a motor vehicle with active stabilizers at the front axle and at the rear axle according to the invention.

Referring now to the figures of the drawings in detail and first, particularly, to FIG. 1 thereof, there is shown a motor vehicle whose front axle 1 and rear axle 2 are in an exemplary manner provided in each case with a stabilizer 3 and, respectively, 4. A driving direction is indicated by an arrow F. The stabilizers or anti-roll devices 3 and 4 are in a customary manner configured as torsion bar stabilizers and are accordingly rotatably mounted on the vehicle body or on a component that is fixed with respect to the vehicle body. The vehicle body is only schematically indicated by a dashed line in FIG. 1. Each stabilizer 3 and, respectively, 4 is, with its ends, further respectively supported via a lever arm on a wheel guiding element, in this case for example on a wheel carrier 5 and, respectively, 6. In case the wheels of an axle alternately jounce and rebound, the stabilizer 3 and, respectively, 4 is twisted and generates a moment or torque counteracting the tendency to roll and, respectively, the jouncing and rebounding (compression and extension of suspension springs) in order to stabilize the vehicle.

In the exemplary embodiment that is shown, the stabilizers 3 and 4 are configured as active stabilizers through the use of which an additional moment or torque can be introduced. For this purpose, the stabilizers 3 and 4 are respectively separated in two parts, which are again connected to one another via an actuator 7 and, respectively, 8. The actuator 7 and, respectively, 8 can be configured as an electromechanical actuator as well as a hydraulic actuator. In particular an actuator as disclosed in Published, Non-Prosecuted German Patent Application No. DE 102 10 306 A1 is suited for this purpose whose disclosure is included in the present description. A torque between the stabilizer ends can be generated by activating the actuator, for example by applying a pressure. A suitable control valve allows in this case a change of the direction of action.

The coupling of the stabilizer sections via the actuator 7 and, respectively, 8 can in this case be performed such that even in the deactivated state a stabilizer effect is maintained even though only a small one. However, it is also conceivable to completely decouple the stabilizer sections with respect to their effect. This allows a favorable maximum articulation of the vehicle wheels for off-road use, i.e. a maximum alternate jounce and rebound without a stabilizing counter torque. When driving straight ahead on a good stretch of a road, the stabilizers 3 and, respectively, 4 may also be deactivated in order to increase the ride comfort.

According to the invention, a distinction is made between two modes of operation, namely an on-road mode and an off-road mode, for which respective different control concepts for the stabilizers 3 and 4 are provided. In the exemplary embodiment shown, the control concepts are implemented with software or hardware in a control device 9 wherein further operating parameters of the vehicle such as the travel speed, the lateral acceleration and information about the state of jounce or rebound of the individual wheels of the vehicle, for example via displacement sensors 10, are made available to the control device 9. Furthermore, the desired mode can be manually set by the driver via a selector switch 11.

Figure 2:
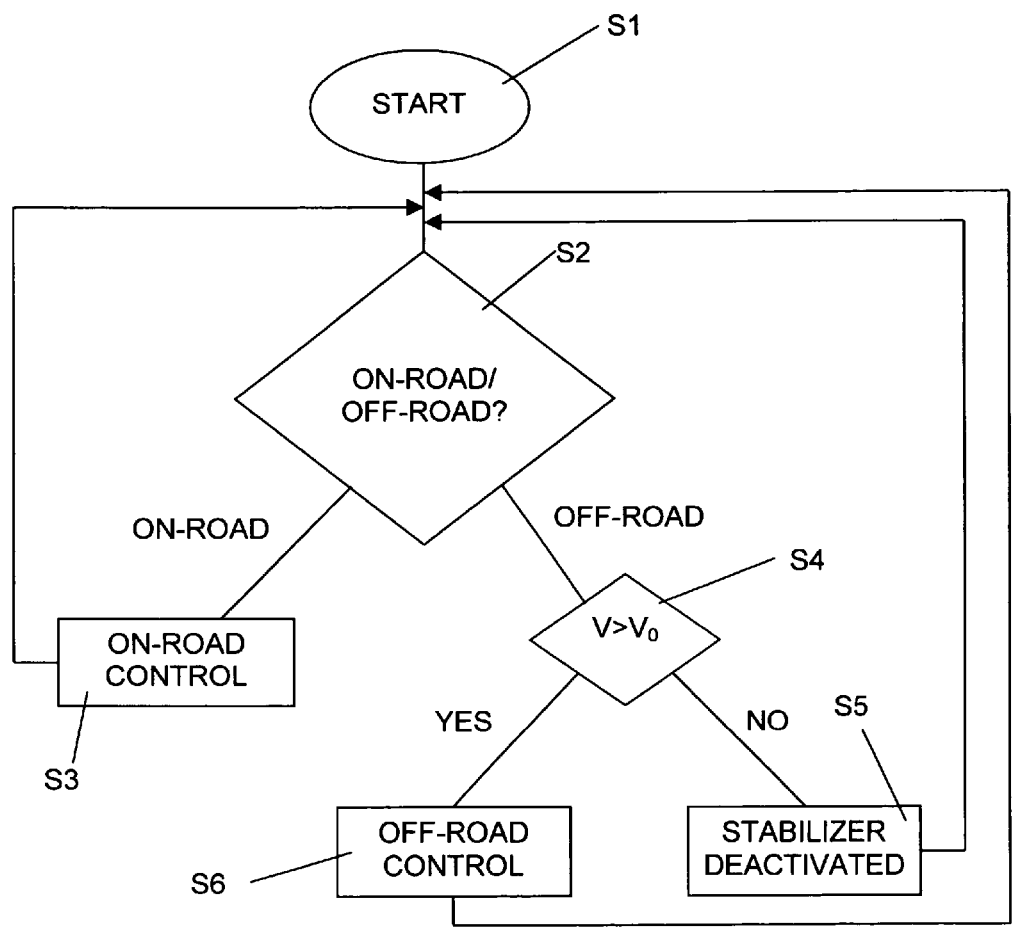
FIG. 2 is a flow chart of a first exemplary embodiment of the method according to the invention.

With reference to FIG. 2 a simple method for operating the active stabilizers 3 and 4 will first be described which achieves good results on smooth roads as well as in off-road conditions. In this case at least one of the stabilizers 3 and 4 is activated and deactivated in the on-road mode in dependence of operating parameters of the motor vehicle, in particular in dependence of the travel speed and/or the lateral acceleration and/or a level sensor system, wherein, in the activated state, rolling motions of the vehicle are reduced by introducing torques into a stabilizer or into the stabilizers which counteract the rolling motion. In the off-road mode on the other hand, the stabilizers are deactivated up to a defined travel speed.

After a system start S1, the method checks in a second step S2 according to which mode the stabilizers 3 and 4 should be controlled. The corresponding selection can, as mentioned above, be performed by using the selector switch 11. Alternatively it is however also possible to provide an automatic terrain detection.

If the on-road mode is requested, then the control S3 is performed whose main focus is the leveling of the vehicle body and influencing the steering tendency of the vehicle.

Respective methods for leveling the vehicle body and influencing a steering tendency are known.

If however the off-road mode is requested, then in a further step S4 it is checked whether the travel speed v is below a limit value $v_0$. If that is the case, then the stabilizers 3 and 4 are deactivated (step S5), in order to allow a maximum articulation at least at slow travel speeds. Otherwise an off-road control S6 is performed in which an actuation or activation of the actuators 7 and 8 is provided in given situations.

The method illustrated in FIG. 2 can be modified in different ways in order to utilize the employment of the active stabilizers for further useful effects, in particular effects which are useful during off-road use.

Figure 3:
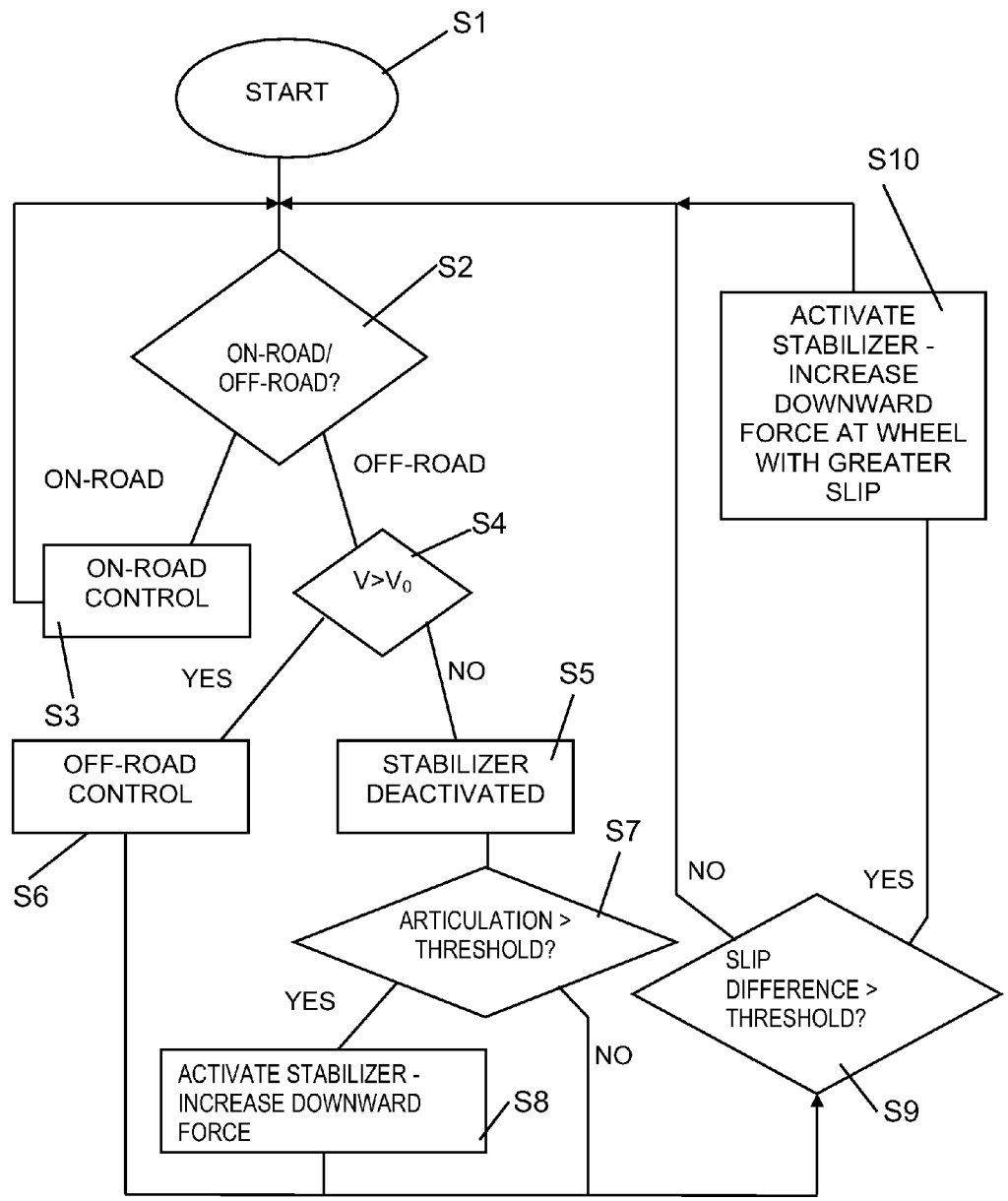
FIG. 3 is a flow chart of a second exemplary embodiment of the method according to the invention.

An example for this is shown in FIG. 3. In this method, the steps S1 to S6 correspond to the method of FIG. 2. In addition however, when the stabilizers are deactivated, here it is checked in a further step S7, whether the articulation of the vehicle wheels, i.e. whether the jounce and rebound of the wheels of an axle exceed a threshold value. If that is the case, as is indicated by step S8, a control of the associated stabilizer is performed such that the downward force of the rebounding wheels is increased, if applicable by taking into account further operating parameters. If the threshold value is not exceeded, the stabilizer may remain deactivated or, alternatively, be activated based on operating parameters. The alternate jounce and rebound of the wheels of an axle can be ascertained by the displacement sensors 10 or by systems having a corresponding information content.

Independent of the steps S6 to S8, it can furthermore be checked in a step S9 whether a wheel has too much slip or is spinning. For that purpose, the wheel slip of the wheels of an axle is ascertained in a conventional manner. If the slip values at the wheels of an axle differ too much from one another, which could for example be determined based on whether a limit value of the slip value difference is exceeded, then a control of the stabilizer is performed such that the downward force of the wheel having the higher slip is increased, as is indicated by step S10. Subsequently, the routine returns to step S2.

Numerous further modifications and variations of the above-described method are possible. For example, the steps S4 and S6 in the method illustrated in FIG. 3 can be omitted. It is furthermore possible to provide a routine according to steps S9 and S10 subsequent to step S3. This way it is possible to achieve the effect of a differential lock so to speak and it is possible to increase traction in low friction conditions and unloaded wheels.

Furthermore it is possible to integrate into the off-road control S6 a functionality corresponding to step S8. It is also conceivable to switch to the on-road control according to step S3 when exceeding the limit speed in step S4 wherein the functionalities of S8 to S10 can be maintained in this case.

Furthermore, when in the off-road mode, it is possible to detect whether the vehicle drives with a tilt angle based on operating parameters of the vehicle such as the signals ascertained from displacement sensors of a level sensor system and, if the vehicle has a tilt angle, one or both stabilizers can be controlled in order to level the vehicle body.

Furthermore, a car jack mode can be implemented for which the stabilizers are controlled such that a vehicle wheel is lifted off an essentially level surface on which the vehicle stands. A corresponding switch can be provided for this purpose.

The control of the stabilizers as illustrated in steps S9 and S10 can also be provided independently of an on-road/off-road selection in vehicles which are configured for only on-road use and which lack the possibility of choosing an off-road mode. The result is in this case a method for operating active stabilizers in motor vehicles wherein the wheel slip at the wheels of an axle is detected and wherein, in case of a noticeable deviation of the slip values between one another, a control of the stabilizers is performed such that the downward force of the wheel having the greater slip is increased, i.e. the force exerted on the ground by the wheel having the greater slip is increased.

A further aspect of the invention is based on the following considerations. The difference of the wheel loads between the right and the left vehicle side is directly dependent on the lateral acceleration. Increasing differences in the wheel loads result in a loss or reduction of the lateral force potential at the corresponding axle because the lateral forces that can be transferred increase to a lesser extent due to the tire characteristics. Via a distribution of the roll moments or roll torques at the vehicle axles, the steering tendency of the vehicle can be influenced with the help of active stabilizers.

In addition, the friction conditions between the vehicle wheels and the ground play an important role. By including these friction conditions in the control of an active roll stabilization, the vehicle handling behavior or driving behavior can be further improved. Information about the current friction conditions are usually present in cars which are provided with ABS (anti-lock braking system) and/or ESP (emergency stability program). The extent of the roll support in dependence of the friction can for example be provided via an input-output characteristic map. In this case, increased roll angles are generally permitted when there are reduced friction coefficients and thus reduced differences in wheel load are produced when compared to the case of high friction coefficients. On the other hand, in case of higher friction values, an increased leveling of the vehicle body is provided.

Such a friction-dependent roll stabilization can be included in an on-road control S3 as well as in an off-road control S6. It can further more be provided independent of an on-road/off-road selection option.

The invention has been described in detail based on preferred exemplary embodiments, however, the invention is not limited to the described exemplary embodiments but includes all forms covered by the claims.

This application claims the priority benefits, under 35 U.S.C. § 119, of German patent application No. 10 2005 009 002.8, filed Feb. 28, 2005; the entire disclosure of this prior application is herewith incorporated by reference.

LIST OF REFERENCE NUMERALS 1 front axle
2 rear axle
3 stabilizer
4 stabilizer
5 wheel carrier
6 wheel carrier
7 actuator
8 actuator
9 control device
10 displacement sensor
11 selector switch
S1-S10 method steps

I claim:

1. A method for operating an active stabilizer, the method which comprises:
selectively operating an active stabilizer of a motor vehicle in an on-road mode and an off-road mode;
wherein in the on-road mode the stabilizer is selectively activated and deactivated in dependence of operating parameters of the motor vehicle such that, in an activated state, a rolling motion of the motor vehicle is reduced by introducing a torque into the stabilizer counteracting the rolling motion;

wherein in the off-road mode up to a given travel speed the stabilizer is deactivated, while above the given travel speed an off-road control is performed in which an activation of the stabilizer is provided in given situations; and wherein in the off-road mode up to the given travel speed it is checked, whether a jouncing and rebounding of the wheels of an axle exceeds a threshold value, and if that is the case, a downward force of a rebounding one of the wheels is increased.

2. The method according to claim 1, which comprises controlling the stabilizer in the on-road mode in dependence of at least one operating parameter selected from the group consisting of a travel speed, a lateral acceleration and a level sensor signal.

3. The method according to claim 1, which comprises operating a further stabilizer of the motor vehicle selectively in the on-road mode and the off-road mode.

4. The method according to claim 1, which comprises manually switching between the on-road mode and the off-road mode.

5. The method according to claim 1, which comprises detecting an alternate jouncing and rebounding of wheels of an axle in the off-road mode by using displacement sensors.

6. The method according to claim 1, which comprises:
detecting whether the motor vehicle drives with a tilt angle in the off-road mode based on operating parameters; and
controlling the stabilizer such that a vehicle body is leveled if it is detected that the motor vehicle drives with a tilt angle.

7. The method according to claim 6, which comprises detecting whether the motor vehicle drives with a tilt angle in the off-road mode based on signals ascertained by displacement sensors of a level sensor system.

8. The method according to claim 1, which comprises:
determining a wheel slip of the wheels of an axle; and
controlling the stabilizer such that a downward force exerted by a first one of the wheels of the axle is increased if wheel slip values of the wheels of the axle differ from one another and the first one of the wheels of the axle has a greater slip than a second one of the wheels of the axle.

9. The method according to claim 1, which comprises providing a car jack mode by controlling stabilizers of the motor vehicle such that a wheel of the motor vehicle is lifted from a substantially level surface on which the motor vehicle stands.

10. The method according to claim 1, which comprises performing a control of a rolling motion of the motor vehicle in dependence of road friction conditions.

11. A motor vehicle configuration, comprising:
an axle having wheels;
an active stabilizer provided between said wheels of said axle;
said active stabilizer having two stabilizer sections separate from one another;
an actuator, said two stabilizer sections being connected to one another via said actuator and said actuator being configured to introduce a torque between said two stabilizer sections;
a control device operatively connected to said actuator for activating and deactivating said actuator, said control device having two operating modes implemented therein including an on-road mode and an off-road mode;
said control device, when operating in the on-road mode, selectively activating and deactivating said active stabilizer in dependence of motor vehicle operating parameters and said control device controlling said active stabilizer such that when said active stabilizer is in an activated state, said active stabilizer reduces a vehicle rolling motion by introducing a torque into said active stabilizer counteracting the vehicle rolling motion; and
said control device, when operating in the off-road mode up to a given travel speed deactivating the stabilizer while above said given travel speed performing an off-road control in which an activation of said stabilizer is provided in given situations, said control device, when operating in the off-road mode up to said given travel speed, checking further whether a jouncing and rebounding of said wheels of said axle exceeds a threshold value, and if that is the case, increasing a downward force of a rebounding one of said wheels.

12. The motor vehicle configuration according to claim 11 wherein said control device, when operating in the on-road mode, controls said active stabilizer in dependence of at least one motor vehicle operating parameter selected from the group consisting of a travel speed, a lateral acceleration, and a level sensor signal.

* * * * *